United States Patent [19]
Kowalski

[11] Patent Number: 5,867,942
[45] Date of Patent: Feb. 9, 1999

[54] REMOVABLE DOOR CASSETTE FOR A VEHICLE AND METHOD OF ASSEMBLY

[75] Inventor: Daniel J. Kowalski, Lake Orion, Mich.

[73] Assignee: Trim Trends, Inc., Farmington Hills, Mich.

[21] Appl. No.: 729,092

[22] Filed: Oct. 15, 1996

[51] Int. Cl.$^6$ .............................. B60J 5/04; B62D 25/04
[52] U.S. Cl. ........................... 49/502; 49/212; 296/146.5
[58] Field of Search ........................... 49/502, 212, 374; 296/146.5; 403/378, 377, 325, 109

[56] References Cited

U.S. PATENT DOCUMENTS

| | | | |
|---|---|---|---|
| 2,980,456 | 4/1961 | McMullin | 403/378 |
| 2,989,968 | 6/1961 | Vogel | 403/378 |
| 3,741,592 | 6/1973 | Muney | 403/377 |
| 4,405,173 | 9/1983 | Piano . | |
| 4,603,894 | 8/1986 | Osenkowski . | |
| 4,685,722 | 8/1987 | Srock . | |
| 4,712,287 | 12/1987 | Johnston . | |
| 4,716,682 | 1/1988 | De Rees . | |
| 4,743,062 | 5/1988 | McLaren et al. . | |
| 4,785,585 | 11/1988 | Grier et al. . | |
| 4,800,638 | 1/1989 | Herringshaw et al. . | |
| 4,827,671 | 5/1989 | Herringshaw et al. . | |
| 4,831,710 | 5/1989 | Katoh et al. . | |
| 4,845,894 | 7/1989 | Herringshaw et al. | 286/146.5 |
| 4,850,636 | 7/1989 | McLaren et al. . | |
| 4,882,842 | 11/1989 | Basson et al. . | |
| 4,924,630 | 5/1990 | Lomansey et al. | 296/146.5 |
| 4,956,942 | 9/1990 | Lisak et al. | 49/212 |
| 4,993,775 | 2/1991 | Keys . | |
| 5,001,867 | 3/1991 | Dupuy . | |
| 5,067,281 | 11/1991 | Dupuy . | |
| 5,095,659 | 3/1992 | Benoit et al. . | |
| 5,111,620 | 5/1992 | Lau et al. . | |
| 5,121,534 | 6/1992 | Kruzich . | |
| 5,160,140 | 11/1992 | Starrett | 403/109 |
| 5,174,066 | 12/1992 | Dupuy . | |
| 5,226,259 | 7/1993 | Yamagata et al. . | |
| 5,287,869 | 2/1994 | Wu | 403/378 |
| 5,308,138 | 5/1994 | Hlavaty . | |
| 5,325,632 | 7/1994 | Djavairian et al. . | |
| 5,351,443 | 10/1994 | Kimura et al. . | |
| 5,352,057 | 10/1994 | Zody | 403/109 |
| 5,355,629 | 10/1994 | Kimura et al. . | |
| 5,379,553 | 1/1995 | Kimura et al. . | |
| 5,398,453 | 3/1995 | Heim et al. . | |
| 5,408,785 | 4/1995 | Heim et al. . | |
| 5,417,470 | 5/1995 | Holt . | |
| 5,433,041 | 7/1995 | Filippi . | |
| 5,462,482 | 10/1995 | Grimes | 296/146.5 |
| 5,469,668 | 11/1995 | Heim et al. . | |
| 5,513,825 | 5/1996 | Gutgsell | 403/377 |
| 5,527,083 | 6/1996 | Kreye . | |
| 5,570,968 | 11/1996 | Sassmannshausen et al. | 403/377 |
| 5,647,171 | 7/1997 | Wirising et al. | 49/502 |

FOREIGN PATENT DOCUMENTS

| | | |
|---|---|---|
| 491917 | 4/1953 | Canada . |
| 057 270 | 8/1982 | European Pat. Off. . |
| 119 775 A2 | 9/1984 | European Pat. Off. . |
| 128 621 A2 | 12/1984 | European Pat. Off. . |
| 148 987 A2 | 7/1985 | European Pat. Off. . |
| 427 153 A2 | 5/1991 | European Pat. Off. . |
| 2 101 535 | 1/1983 | United Kingdom . |
| 2 117 329 | 10/1983 | United Kingdom . |
| 2 149 726 | 6/1985 | United Kingdom . |
| 2 222 847 | 3/1990 | United Kingdom . |
| 2 250 534 | 6/1992 | United Kingdom . |

*Primary Examiner*—Daniel P. Stodola
*Assistant Examiner*—Curtis Cohen
*Attorney, Agent, or Firm*—Dykema Gossett PLLC

[57] ABSTRACT

A removable door cassette has a cross member having a lower door frame fixed thereto. The lower door frame has a first frame member fixed to the cross member and a second frame member defining a channel to receive the first frame member. The first frame member is separable from the second frame member. A pivot connection pivotally connects the second frame member to a door housing. A fastener fixedly secures the second frame member in relation to the door housing. A deformable button is preferably used to provide a mechanism to hold the lower door frame into the lower door frame channel and provide a release and locking mechanism between the first and second frame members.

52 Claims, 5 Drawing Sheets

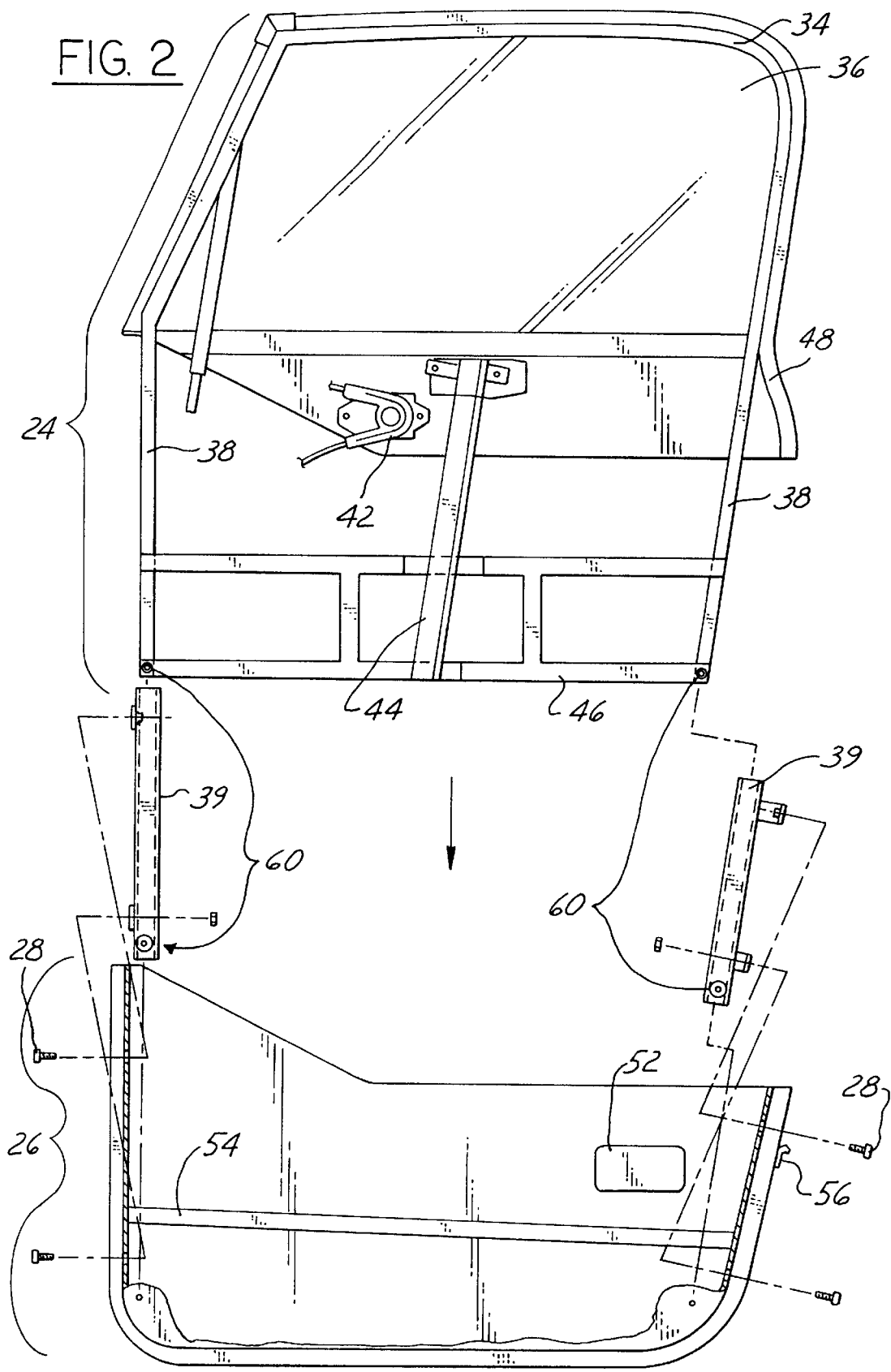

REMOVABLE DOOR CASSETTE FOR A VEHICLE AND METHOD OF ASSEMBLY

INCORPORATION BY REFERENCE

This application is related to co-pending application entitled, "Door Cassette for a Vehicle and Method of Assembly", Serial No. 08/729,875, which is commonly owned, filed simultaneously herewith and incorporated by reference.

BACKGROUND OF THE INVENTION

The present invention relates generally to a door for an automotive vehicle, and, more specifically, to an improved door cassette assembly which may be easily removed and reinstalled by the vehicle operator.

Traditionally, doors for automotive vehicles are assembled on the assembly line simultaneously with the rest of the vehicle. During the assembly process, components such as the regulator that controls the operation of the window are tested for operability. The manufacturing personnel and time required to perform the installation and testing of the individual components are significant. If a component does not function properly, the component must be readjusted adding delay into the assembly process.

To facilitate assembly, it has been suggested to modularize the door assembly. That is, a preassembled cassette containing the movement and locking hardware is provided to the vehicle manufacturer as a single unit. Prior to installation, the door cassette may be tested off-line conserving valuable assembly resources.

In certain vehicles it is desirable to have the door cassette removable from the vehicle body. In this manner, the vehicle may be operated without the upper half of the door. Vehicles that are particularly desirable for removable door cassettes are small size sport utility vehicles. Small size sport utility vehicles are increasing in popularity. Providing a great number of features as well as providing high quality is of great importance. The door cassette must fit well to prevent wind noise and water leakage when installed.

The fit of the vehicle door is tested on the assembly line. Since a very small misadjustment may lead to water leaks or wind noise, it is desirable to provide capability to adjust the door cassette to eliminate any misadjustment.

In one modular door construction, the door cassette is removable from the rest of the door by the vehicle operator. A frame member extends up from the door to which the module attaches. One drawback to the system is that an adjustment of the cassette inward to the vehicle body to prevent wind noise and water leaks is not possible since the cassette connects to a frame member having limited adjustability.

It would therefore be desirable to provide a vehicle door having the mechanical portion assembled offline, having the door cassette removable by the vehicle operator and providing on line adjustability to reduce wind noise and water leaks.

SUMMARY OF THE INVENTION

Briefly, the present invention provides a cross member having a lower door frame fixed thereto. The lower door frame has a first frame member fixed to the cross member and a second frame member defining a channel to receive the first frame member. The first frame member is separable from the second frame member. A pivot connection pivotally connects the second frame member to a door housing. A fastener fixedly secures the second frame member in relation to the door housing.

In one embodiment of the invention a push button may be used to secure the first frame member within the second frame member so that the door cassette may be easily separated from the door housing.

In a further embodiment of the invention, the fastener to secure the second frame member to the door housing may have a first adjuster to fasten the second door frame into a first position and a second adjuster to adjust the frame about its pivot to secure the frame into a final position. The second adjuster may have a screw that moves the cassette closer to or away from the vehicle frame. The screw preferably adjusts the door a small metered amount for each rotation so that the door cassette may be easily and precisely aligned.

An advantage of the invention is that the door frame may be easily adjusted during the assembly process to eliminate water leaks or wind noise. The second frame is fixed into the door housing to maintain the adjustment. When the door cassette is remove and replaced the original adjustment is maintained.

BRIEF DESCRIPTION OF THE DRAWINGS

Other features and advantages of the present invention will become apparent from the following detailed description which should be read in conjunction with the drawings in which.

FIG. 2 is an exploded view of a vehicle door according to the present invention;

DETAILED DESCRIPTION OF THE PREFERRED EMBODIMENT

Figure 1:
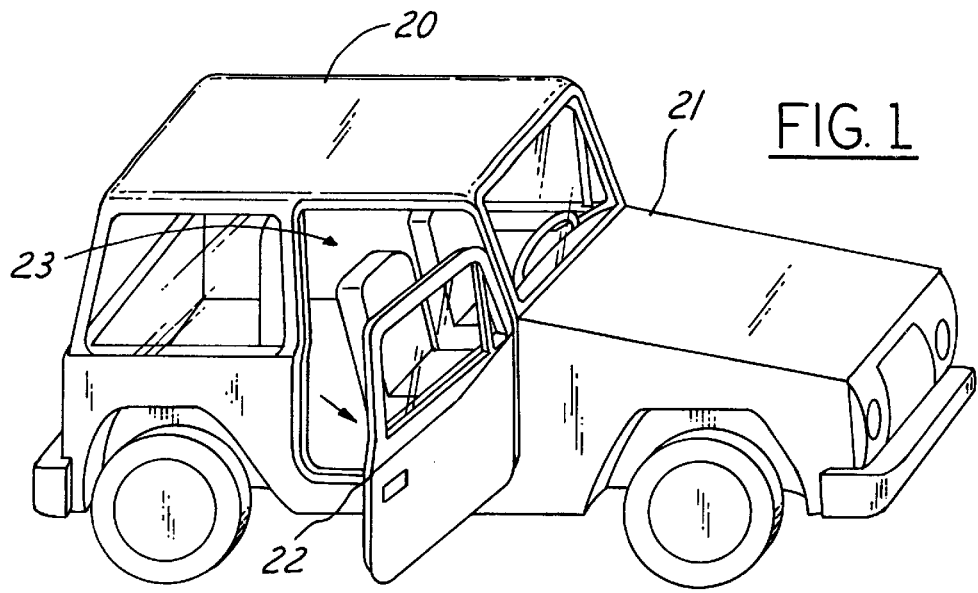
FIG. 1 is a perspective view of an automotive vehicle having a vehicle door according to the present invention.

Referring now to the drawings, like reference numerals are used to identify identical components in the various views. Although the invention will be illustrated in the context of a framed vehicle door, it will be appreciated that this invention may be used in conjunction with other applications requiring an adjustable vehicle door such as a frameless window application.

Referring now to FIG. 1, an automotive vehicle 20 is shown having a vehicle body 21 and an automotive vehicle door assembly 22 for closing an opening 23 in vehicle body 21. The terms, interior, exterior, rearward and forward, as used in this description, are related to door assembly as installed in vehicle body 21. The door assembly 22 described hereinafter is a passenger side door. A driver side door would essentially be the mirror of the passenger side door.

Referring now to FIG. 2, door assembly 22 is shown in an exploded view having door cassette 24 separated from lower door 26. Pivot bolts 28, mounting bolts 30 and fine adjust bolts 90 (shown best in FIG. 11) are used to mount door cassette 24 to lower door 26. Pivot bolts 28 pivotally connect door cassette 24 to lower door 26 when door cassette 24 is housed by lower door 26. The axis of the pivot allows door cassette 24 to move laterally with respect to the vehicle body when the door is closed. Mounting bolts 30 fix lower door cassette 24 into a predetermined position with respect to the vehicle body.

Door cassette 24 includes a door frame having an upper door frame 34, lower door frame 38 and lower door frame channel 39, a window 36 and its associated hardware, a plate member 40 and a cross member 46. A seal 48 may also be included as part of door cassette 24.

Upper door frame 34 defines an opening to enclose window 36. Upper door frame 34 is preferably roll formed but may also be stamped from steel. Of course, light weight material may be used in door cassette 24 such as plastic or aluminum if structural integrity is maintained. Upper door frame 34 may be eliminated in a frameless window application for applications such as a convertible.

Lower door frame 38 and lower door frame channel 39 extend into lower door 26 when assembled. As shown, both lower door frame 38 and lower door frame channel 39 comprise two members, one of each on the forward most end and rearward most end of door cassette 24. Each member of lower door frame 38 extends from upper door frame 34 near pivot bolt 28. Lower door frame 38 and upper door frame 34 may be separate pieces but may also be formed as a single continuous piece with upper door frame 34. When formed as a continuous piece the transition between upper door frame 34 and lower door frame 38 is roughly at pivot bolts 28.

Lower door frame channel 39 preferably defines a partially open channel into which lower door frame 38 slidably engages. Although the shape is not critical, lower door frame channel 39 as shown is essentially a square channel with one side removed. Other shapes would be evident to those skilled in the art. Lower door frame 38 is fully removable from within the lower door frame channel 39. Lower door frame channel 39 is used as means to secure door cassette 24 to lower door 26 by remaining fixed to lower door 26 once door cassette 24 is assembled and adjusted to fit to the vehicle body. When the lower door frame 38 is replaced after removal, the entire door cassette 24 is fixed in its previously adjusted position. A button assembly 60 keeps lower door frame 38 engaged with lower door frame 39.

Plate member 40 is preferably an individual stamped piece that extends across door cassette 24 and is rigidly connected to the two members of lower door frame 38. Plate member 40 is shaped to provide attachment points for window and door movement hardware such as a window regulator 42 and glass guides 44. Plate member 40 may also provide some structural rigidity to door cassette by acting as a cross support.

Cross member 46 extends across door cassette 24 between the two members of lower door frame 38 and provides rigidity for door cassette 24. Because lower door frame 38 is used to secure door cassette 24, cross member 46 preferably connects to lower door frame 38 near where lower door frame 38 secures to lower door 26. Cross member 46 also provides rigidity to door cassette when shipped since door cassette 24 is built off line and transported before assembly. Cross member may also serve the purpose of providing a surface on which door cassette can rest when removed from the vehicle. Cross member 46 is preferably flat on its bottom end and connects the lowermost ends of lower door frame 38 to provide maximum rigidity to prevent damage to door cassette 24. Cross member 46 may also be structured to provide support so that door cassette 24 may be self supporting when removed from lower door 26.

Seal 48 extends around upper door frame 34 for sealing upper door frame 34 against the vehicle body. When supplied to the vehicle manufacturer door cassette 24 may contain seal 48 pre-installed on upper door frame 34. An additional seal my be provided on lower door 26. Preferably seal 48 and the seal on lower door 26 provide a complete seal around door assembly 24. If a long seal is provided with door cassette 24, seal 48 may be fastened to lower door 26 after door cassette 24 is installed and adjusted. Seal 48 may also be used to cover connecting hardware such as pivot bolts 28.

Lower door 26 may be supplied by the vehicle manufacturer and has the necessary structure to connect to door cassette 24. Lower door 26 is shaped generally to define a cavity to receive door cassette 24. Lower door 26 has an outer door panel 50 contoured to meet the styling for the desired vehicle application. Outer door panel 50 has an opening 52 for receiving a door handle and lock.

Lower door 26 may also have a side impact beam 54 to meet government mandates. Side impact beam 54 extends across lower door 26. Side impact beam 54 is used to provide structural rigidity to lower door 26 in the event of a side impact.

A latch 56 may also be included in lower door 26. Latch 26 is preferably a conventional type latch. Including latch 56 on lower door 26 provides a means to keep the door assembly closed if desired during positioning of door cassette 24.

Figure 3:
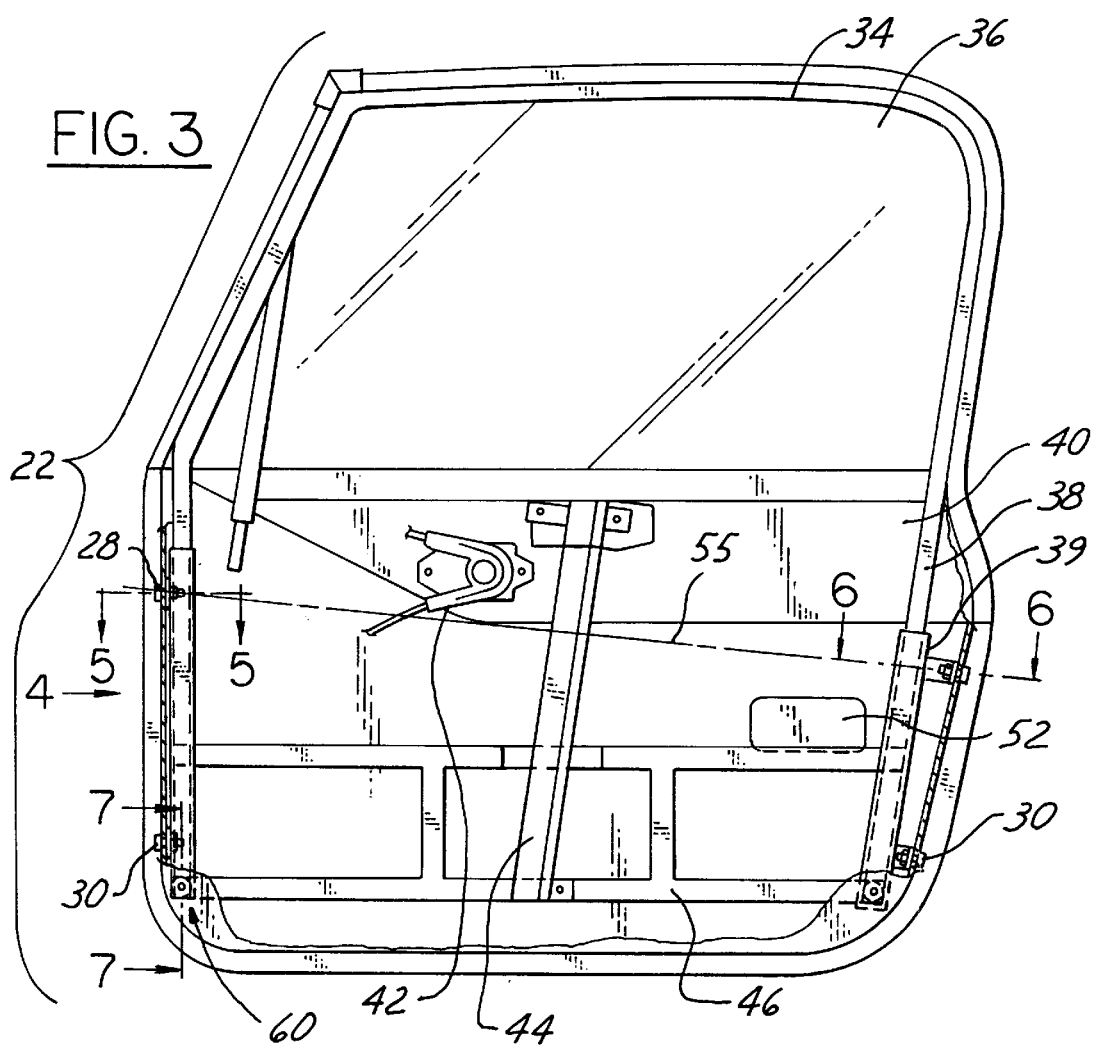
FIG. 3 is an interior view of an assembled vehicle door according to the present invention.

Referring now to FIG. 3, door cassette 24 is installed within lower door 26. Pivot bolts 28, mounting bolts 30 and button assemblies 60 are used to position door cassette 24 within lower door 26 and with respect to the vehicle body. Pivot bolts 28 define an axis 55 around which door cassette 24 rotates.

Although not shown, a finished trim panel is fastened to lower door 26 to complete assembly. The trim panel contains the buttons and levers to provide a vehicle operator interface to control the functions provided by the door assembly such as moving the window and locking the door.

Figure 4:
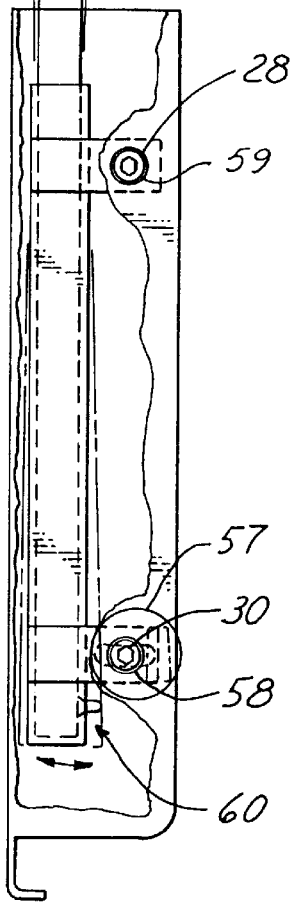
FIG. 4 is a partial cutaway view of an end of an automobile door looking forward.

Referring now to FIG. 4, when door cassette 24 is first placed into lower door 26, the position secured is governed by mounting bolt 30 and its associated hardware. Mounting bolt 30 is secured to lower door through a slot 58. The pivot movement of door cassette 24 is shown around pivot bolt 28. The maximum distance for movement is governed by slot 58. An opening 57 in lower door 26 allows access to mounting bolt 30. During assembly door cassette 24 is positioned and mounting bolt 30 is tightened to set door frame channel 39 to correspond to a finished position.

Figure 5:
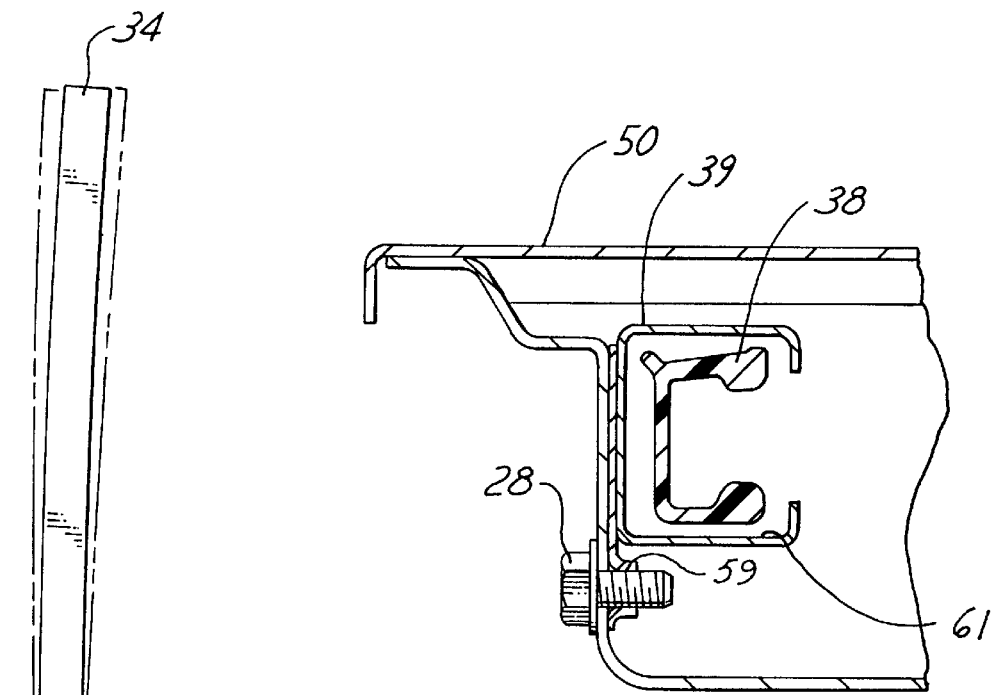
FIG. 5 is a cross-sectional view through the forward most pivot point of a vehicle door.
Figure 6:
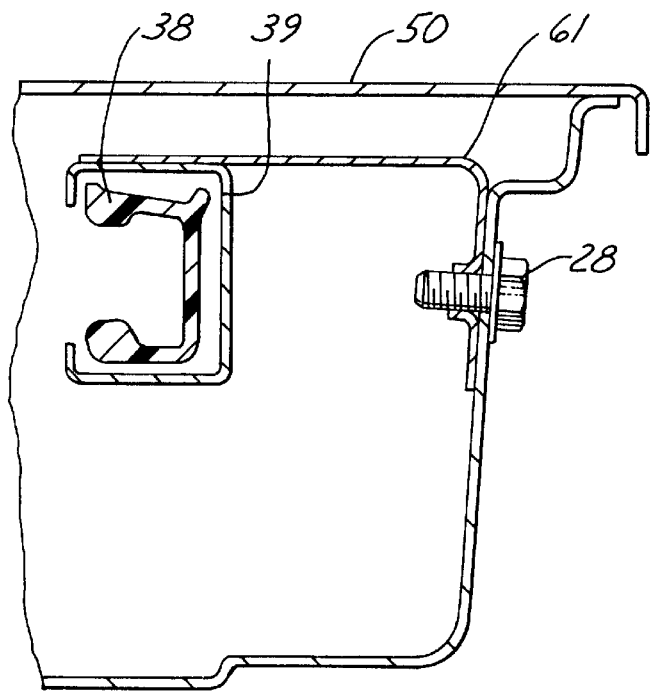
FIG. 6 is a cross-sectional view of the rear most pivot point of a vehicle door.

Referring now to FIGS. 5 and 6, a portion of lower door 26 is shown with its pivot means. As shown, the pivot means in lower door 26 may be a U-shaped channel or a hole 59 into which pivot bolts 28 rest. Of course, other means for pivoting would be known to those skilled in the art such as providing a pin on either door cassette 24 or lower door 26 that cooperate to provide a pivoting motion. Flanges 61 are secured to lower door frame channel 39 and to pivot bolt 28. Pivot bolt 28, however, may also be connected directly to lower door frame channel 39.

Figure 7:
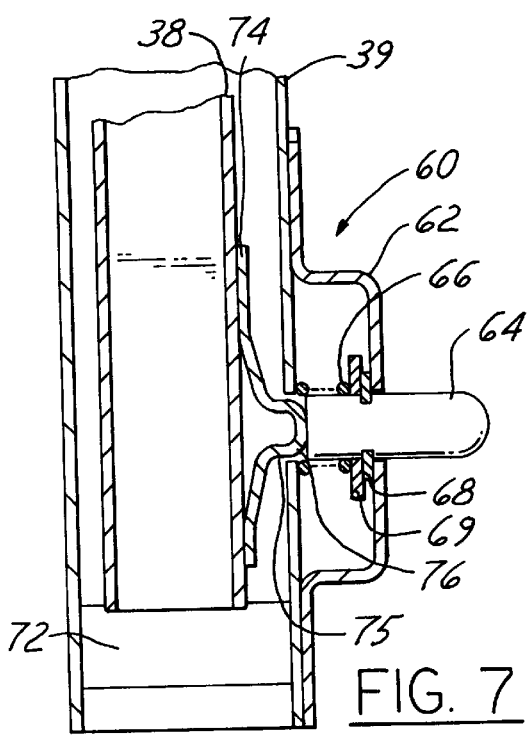
FIG. 7 is a cross-sectional view through the deformable button when a lower door frame and lower door frame channel are engaged at a hole in the lower door frame channel.

Referring now to FIG. 7, deformable button assembly 60 is shown in greater detail. Button assembly 60 provides an easy way to secure and remove door cassette 24 from door housing 26. Button assembly 60 preferably has a housing 62 formed over a hole 75 in lower door frame channel 39. A button 64 may extend partially outside housing 62. A spring 66 is used to bias button 64 outside housing 62. Retainers 68 and 69 are secured to button 64 to prevent button 64 from fully extending out of housing 62 and as a means to retain spring 66 within housing 62. One button assembly may be located on each lower frame member.

A flexible detent engager 74 is fixedly secured to lower door frame 38. Flexible detent engager 74 has a ridge 76 that extends outwardly from detent engager 74. Detent engager 74 deforms to fit between lower door frame channel 39 and lower door frame 38. When ridge 76 on detent engager 74 reaches button 64, ridge 76 expands against button 64 and holds lower door frame 38 in place.

A stop 72 is mounted within lower door frame channel 39 to provide the lower limit of travel of lower door frame 38 within lower door frame channel 39. Stop 72 prevents frame 38 from being inserted further than desired, i.e., so ridge 76 does not extend past hole 75. Stop 72 may be formed of a resilient material such as rubber or the like and is slightly in compression when ridge 76 is aligned with hole 75 and lower door frame contacts stop 72.

Figure 8:
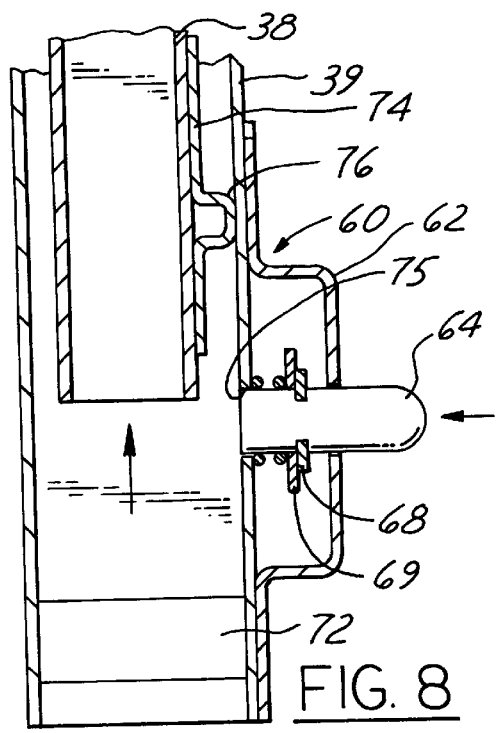
FIG. 8 is a cross-sectional view through the deformable button when the lower door frame and the lower door frame channel are not engaged.

Referring now to FIG. 8, to remove door cassette 24 from lower door, button 64 is pushed to deform ridge 76 into channel 39. Door cassette 24 may then be lifted from lower door 26. Since stop 72 is slightly deformed when ridge 72 aligns with button 64, a slight upward force is provided by stop 72 to assist in removing the door cassette from the lower door. This slight upward force prevents ridge 76 from becoming unintentionally re-engaged within hole 75. As is shown, ridge 76 on flexible detent engager 74 is deformed to allow lower door frame to move within lower door frame channel 39.

Figure 9:
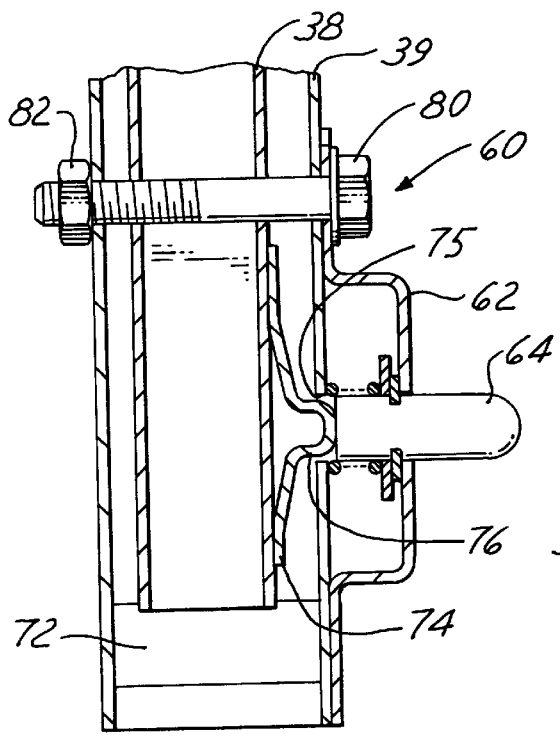
FIG. 9 is a cross-sectional view through a deformable button in which a securing bolt is used as an additional means to secure lower or frame to channel.

Referring now to FIG. 9, a bolt 80 and nut 82 are shown in addition to deformable button assembly as an additional means for securing door cassette 24 to lower door 26. In this configuration, to remove the door cassette 24 from lower door 26, bolt 80 must be removed from nut 82. Nut 82 is shown on the outside of channel 39. Nut 82, however, may be also integral to the interior of channel 39. That is, nut 82 may be welded in place.

Figure 10:
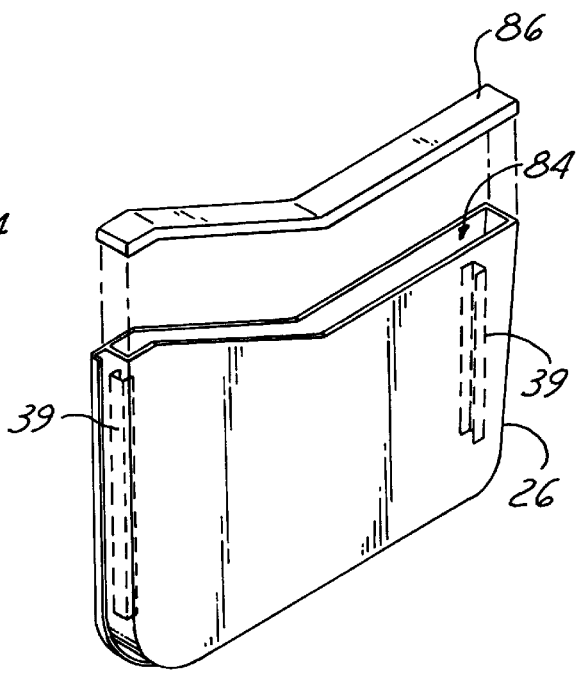
FIG. 10 is a perspective view of a lower door having the door cassette removed.

Referring now to FIG. 10, a lower door 26 is shown having the door cassette removed. Lower door frame channel 39 remains fixed within lower door 26 to cover the opening 84 left by the removal of the door cassette a cover may be used during the operation of the vehicle. Cover 86 may be of a plastic or metal material sized to fit within opening 84. Cover 86 may be snapped fit or screwed to fasten cover 86 to opening 84.

Figure 11:
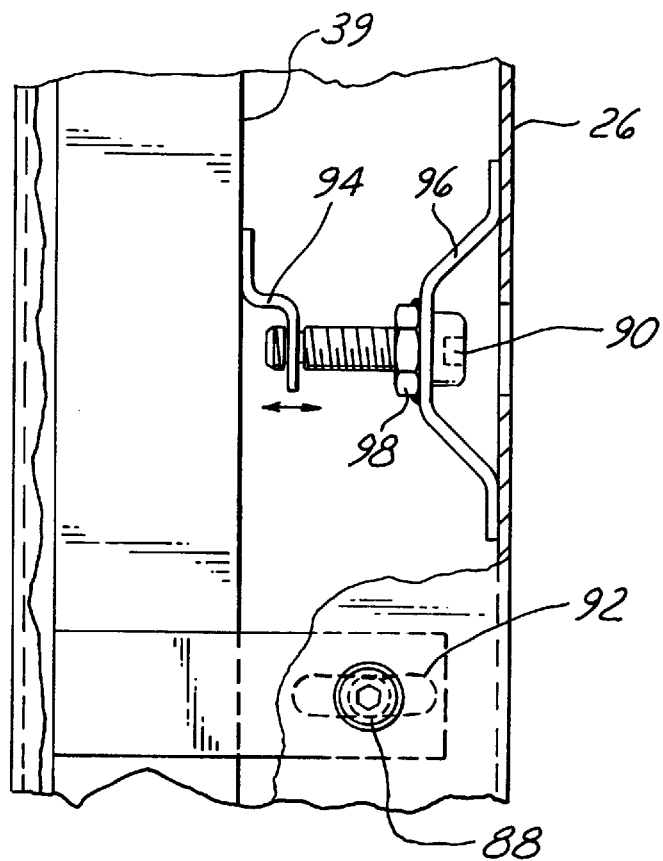
FIG. 11 is a cross-sectional view of an adjustment mechanism having fine and coarse adjustment of lower frame channel with respect to lower door.

Referring now to FIG. 11, an alternative adjustment configuration is shown for adjusting lower door frame channel 39. A coarse adjust bolt 88 and a fine adjust bolt 90 may be used to adjust lower door frame channel 39 within lower door 26. One set of a coarse adjust bolt 88 and fine adjust bolt 90 may be used to mount each lower door frame channel 39. The coarse adjustment and fine adjustment may be similar to those described in the co-pending application incorporated by reference above. Coarse adjust bolt 88 may be similar to that of mounting bolt 30 described above. That is, coarse adjust bolt 88 may be placed through a slot 92 which defines the amount of adjustment possible for lower door frame channel 39. Once door cassette 24 is placed within lower door 26, coarse adjust bolt 88 is used to finely adjust the position of lower door frame channel 39. Fine adjust bolt 90 may engage a flange 94 that is secured to lower door frame channel 39. Another flange 96 may be used to mount fine adjust bolt 90 relative to lower door 26. A nut 98 may be used to provide threaded movement between fine adjust bolt 90 and flange 94. It is preferred that the rotation of fine adjust bolt 90 moves lower door frame channel 39 a predetermined distance with respect to the vehicle. For example, a full rotation of fine adjust bolt 90 may correspond to a movement of the upper door frame of one millimeter.

In operation, lower door 26 may be manufactured and installed on the vehicle so that lower door 26 may be painted along with the rest of the vehicle. During the assembly process door cassette 24 is placed into lower door 26. Pivot bolts 28 are inserted so that door cassette pivots in lower door 26. Once placed in an adjusted position, mounting bolts 30 are tightened to hold lower door frame channel 39 into that position. As described above, a coarse adjustment and a fine adjustment may be used in place of mounting bolts 30. Once mounted and adjusted, lower door frame channel 39 remains mounted to the vehicle. By depressing the button 64, the rest of door cassette 24 may be removed from lower door 26. That is, lower door frame 38 may be removed from lower door frame channel 39. A cover may be placed on the lower door 26 to fill the void left in lower door 26 from removal of door cassette 24.

While the best mode for carrying out the present invention has been described in detail, those familiar with the art to which this invention relates will recognize various alternative designs and embodiments for practicing the invention as defined by the following claims. For example in a frameless window application the upper door frame and seal may be eliminated, the seal may placed on the vehicle body.

What is claimed is:

1. A removable door cassette for insertion into an automotive vehicle door housing said door housing having a cassette opening, said cassette comprising:

a window;

a cross member;

a door frame having a lower door frame, said lower door frame insertable into the door housing, said lower door frame having a first frame member fixed to said cross member and a coaxial second frame member defining a channel to slidably receive said first frame member, said first frame member being slidably separable from said second frame member; and a fastener for securing said second frame member in relation to the door housing to allow said first frame member to be slidably removed from the second frame member.

2. A removable door cassette as recited in claim 1, further comprising a pivot connection pivotally connecting said second frame member to the door housing.

3. A removable door cassette as recited in claim 2, wherein said pivot connection comprises a slot in the door housing, and a bolt, said bolt connecting the door housing to said door frame through said slot.

4. A removable door cassette as recited in claim 1, wherein said fastener comprises a releasable fastener which secures said first frame member within said second frame member.

5. A removable door cassette as recited in claim 1, further comprising a compliant stop mounted to said second frame member, said stop defining a lower travel point of said first frame member within said second frame member.

6. A removable door cassette as recited in claim 1, further comprising an opening cover to be placed in the cassette opening when said door cassette is removed from the door housing.

7. A removable door cassette as recited in claim 1, wherein said door frame further comprises an upper door frame connected to said lower door frame, said upper door frame extending from the door housing and defining a window opening.

8. A removable door cassette as recited in claim 7, wherein further comprising a seal connected to said upper door frame.

9. A removable door cassette as recited in claim 1, wherein said first frame member is continuous with said lower door frame.

10. A removable door cassette as recited in claim 1, wherein said fastener comprises a coarse adjustment for adjusting said second frame member into a first position.

11. A removable door cassette as recited in claim 10, wherein said coarse adjustment comprises a first bracket affixed to the door housing, said first bracket having a slot, and an adjustable fastener received through said slot for connecting said first bracket to said second frame member.

12. A removable door cassette as recited in claim 1, further comprising a second fastener adjustably fastening said second frame member in relation to the door housing.

13. A removable door cassette as recited in claim 12, wherein said second fastener is accessible through a side of the door housing.

14. A removable door cassette as recited in claim 12, wherein said second fastener comprises a fine adjustment for adjusting said second frame member to a final position.

15. A removable door cassette as recited in claim 1, further comprises a plate member connected to said door frame.

16. A removable door cassette as recited in claim 15, wherein said window is connected to said plate member.

17. A removable door cassette as recited in claim 16, further comprises a window adjustment means connected to said window for adjusting said window.

18. A removable door cassette as recited in claim 17, wherein said adjustment means comprises glass guides and a window regulator.

19. A removable door cassette for insertion into an automotive vehicle door housing, the door housing having a cassette opening, said cassette comprising:
a cross member;
a door frame having a lower door frame, said lower door frame insertable into the door housing, said lower door frame having a first frame member fixed to said cross member and a second frame member defining a channel to receive said first frame member, said first frame member being separable from said second frame member;
a fastener for securing said second frame member in relation to the door housing;
said fastener comprises a releasable fastener which secures said first frame member within said second frame member;

said releasable fastener comprises a deformable button secured to said first frame member, said second frame member having a button opening sized to receive said button, said button operable to allow said first frame member to move relative to said second frame member unless said button is aligned with said button opening.

20. A removable door cassette for insertion into an automotive vehicle door housing, the door housing having a cassette opening, said cassette comprising:
a cross member;
a door frame having a lower door frame, said lower door frame insertable into the door housing, said lower door frame having a first frame member fixed to said cross member and a second frame member defining a channel to receive said first frame member, said first frame member being separable from said second frame member;
a fastener for securing said second frame member in relation to the door housing;
said fastener comprises a releasable fastener which secures said first frame member within said second frame member;
a second fastener for adjustably fastening said second frame member in relation to the door housing;
said second fastener comprises a fine adjustment for adjusting said second frame member to a final position;
said fine adjustment comprises a second bracket, said second bracket receiving a threaded fastener, said threaded fastener engaging said lower door frame and moving relative to said second bracket when rotated so that said lower door frame moves as said threaded fasteners rotates.

21. A removable door cassette for insertion into an automotive vehicle door housing, said door housing having a cassette opening, said cassette comprising A door cassette for mounting in a cassette opening of a door housing of an automotive vehicle comprising:
a cross member;
a door frame having a lower door frame, said lower door frame insertable into the door housing, said lower door frame having a first frame member fixed to said cross member and a second frame member defining a channel to slidingly receive said first frame member, said first frame member being slidingly separable from said second frame member; and
pivot means for pivotally joining said door frame to the door housing; and
attachment means for securing said second frame member in relation to the door housing.

22. A removable door cassette as recited in claim 21, wherein said attachment means comprises a releasable fastener which secures said first frame member within said second frame member.

23. A removable door cassette as recited in claim 21, further comprising a compliant stop mounted to said second frame member, said stop defining a lower travel point of said first frame member within said second frame member.

24. A removable door cassette as recited in claim 21, further comprising an opening cover to be placed in the cassette opening when said door cassette is removed from the door housing.

25. A removable door cassette as recited in claim 21, wherein said door frame further comprises an upper door frame connected to said lower door frame, said upper door frame extending from the door housing and defining a window opening.

26. A removable door cassette as recited in claim 25, further comprising a seal connected to said upper door frame.

27. A removable door cassette as recited in claim 21, wherein said upper door frame is continuous with said lower door frame.

28. A removable door cassette as recited in claim 21, wherein said pivot means comprises a slot in the door housing, and a bolt, said bolt connecting the door housing to said door frame through said slot.

29. A removable door cassette for insertion into an automotive vehicle door housing, said door housing having a cassette opening, said cassette comprising:

a cross member;

a door frame having a lower door frame, said lower door frame insertable into the door housing, said lower door frame having a first frame member fixed to said cross member and a second frame member defining a channel to receive said first frame member, said first frame member separable from said second frame member;

pivot means for pivotally joining said door frame to the door housing;

attachment means for securing said second frame member in relation to said lower door frame;

said attachment means comprises a releasable fastener which secures said first frame member within said second frame member;

said releasable fastener comprises a deformable button secured to said first frame member, said second frame member having a button opening sized to receive said button, said button operable to allow said first frame member to move relative to said second frame member unless said button is aligned with said button opening.

30. A removable door cassette for insertion into an automotive vehicle door housing, said door housing having a cassette opening, said cassette comprising:

a cross member;

a door frame having a lower door frame, said lower door frame insertable into the door housing, said lower door frame having a first frame member fixed to said cross member and a second frame member defining a channel to receive said first frame member, said first frame member separable from said second frame member; and pivot means for pivotally joining said door frame to the door housing;

attachment means for securing said second frame member in relation to said lower door frame;

said attachment means comprises a first means for adjusting said second frame member into a first position and a second means for adjusting said second frame to a final position.

31. A removable door cassette as recited in claim 30, wherein said second means comprising a second bracket, said second bracket receiving a threaded fastener, said threaded fastener engaging said second frame member and moving relative to said second bracket when rotated so that said second frame member moves as said threaded fastener rotates.

32. A removable door cassette as recited in claim 30, wherein said first means comprising a first bracket affixed to the door housing, said first bracket having a slot, and a fastener received through said slot connecting said first bracket to said second frame member.

33. An automobile comprising:

a vehicle body having one or more body openings;

a door housing in at least one of said body openings, each door housing having an end; and a door cassette coupled to said door housing, each door cassette having a cross member;

a door frame having a lower door frame, said lower door frame extending into said door housing, said lower door frame having a first frame member fixed to said cross member and a second frame member defining a channel to slidably receive said first frame member, said first frame member being slidably separable from said second frame member; and a fastener for securing said second frame member in relation to said door housing to allow said first frame member to be slidably removed from the first frame member.

34. An automobile as recited in claim 33, further comprising a pivot connection pivotally connecting said second frame member to said door housing.

35. An automobile as recited in claim 34, wherein said pivot connection comprises a slot in said door housing, and a bolt, said bolt connecting said door housing to said door frame through said slot.

36. An automobile as recited in claim 33, wherein said fastener comprises a releasable fastener which secures said first frame member within said second frame member.

37. An automobile as recited in claim 33, further comprising a compliant stop mounted to said second frame member, said stop defining a lower travel point of said first frame member within said second frame member.

38. An automobile as recited in claim 33, further comprising an opening cover to be placed in the cassette opening when said door cassette is removed from said door housing.

39. An automobile as recited in claim 33, wherein said door frame further comprises an upper door frame connected to said lower door frame, said upper door frame extending from said door housing and defining a window opening.

40. An automobile as recited in claim 39, wherein further comprising a seal connected to said upper door frame.

41. An automobile as recited in claim 33, wherein said first frame member is continuous with said lower door frame.

42. An automobile as recited in claim 33, wherein said fastener comprises a coarse adjustment for adjusting said second frame member into a first position.

43. An automobile as recited in claim 33, further comprising a second fastener adjustably fastening said second frame member in relation to said door housing.

44. An automobile as recited in claim 43, wherein said second fastener is accessible through a side of said door housing.

45. An automobile as recited in claim 44, wherein said second fastener comprises a fine adjustment for adjusting said second frame member to a final position.

46. An automobile as recited in claim 33, further comprises a plate member connected to said door frame.

47. An automobile as recited in claim 46, further comprises a window connected to said plate member.

48. An automobile as recited in claim 47, further comprises a window adjustment means connected to said window for adjusting said window.

49. An automobile as recited in claim 48, wherein said adjustment means comprises glass guides and window regulator.

50. An automobile comprising:

a vehicle body having one or more body openings;

a door housing in at least one of said body openings, each door housing having an end;

a door cassette coupled to said door housing, each door cassette having, a cross member;

a door frame having a lower door frame, said lower door frame extending into said door housing, said lower door frame having a first frame member fixed to said cross member and a second frame member defining a channel to receive said first frame member, said first frame member being separable from said second frame member;

a fastener for securing said second frame member in relation to said door housing;

said fastener comprises a releasable fastener which secures said first frame member within said second frame member;

said releasable fastener comprises a deformable button secured to said first frame member, said second frame member having a button opening sized to receive said button, said button operable to allow said first frame member to move relative to said second frame member unless said button is aligned with said button opening.

51. An automobile comprising:

a vehicle body having one or more body openings;

a door housing in at least one of said body openings, each door housing having an end;

a door cassette coupled to said door housing, each door cassette having a cross member;

a door frame having a lower door frame, said lower door frame extending into said door housing, said lower door frame having a first frame member fixed to said cross member and a second frame member defining a channel to receive said first frame member, said first frame member being separable from said second frame member;

a fastener for securing said second frame member in relation to said door housing;

said fastener comprises a coarse adjustment for adjusting said second frame member into a first position;

said coarse adjustment comprises a first bracket affixed to said door housing, said first bracket having a slot, and an adjustable fastener received through said slot for connecting said first bracket to said second frame member.

52. An automobile comprising:

a vehicle body having one or more body openings;

a door housing in at least one of said body openings, each door housing having an end;

a door cassette coupled to said door housing, each door cassette having a cross member;

a door frame having a lower door frame, said lower door frame extending into said door housing, said lower door frame having a first frame member fixed to said cross member and a second frame member defining a channel to receive said first frame member, said first frame member being separable from said second frame member;

a fastener for securing said second frame member in relation to said door housing;

a second fastener adjustably fastening said second frame member in relation to said door housing;

said second fastener comprises a fine adjustment for adjusting said second frame member to a final position;

said fine adjustment comprises a second bracket, said second bracket receiving a threaded fastener, said threaded fastener engaging said lower door frame and moving relative to said second bracket when rotated so that said lower door frame moves as said threaded fastener rotates.

* * * * *